(12) United States Patent
Buescher

(10) Patent No.: US 11,371,751 B2
(45) Date of Patent: *Jun. 28, 2022

(54) GAS VALVE CONTROL SYSTEM FOR A WATER HEATER

(71) Applicant: Emerson Electric Co., St. Louis, MO (US)

(72) Inventor: Thomas P. Buescher, Webster Groves, MO (US)

(73) Assignee: Emerson Electric Co., St. Louis, MO (US)

( * ) Notice: Subject to any disclaimer, the term of this patent is extended or adjusted under 35 U.S.C. 154(b) by 204 days.

This patent is subject to a terminal disclaimer.

(21) Appl. No.: 16/796,431

(22) Filed: Feb. 20, 2020

(65) Prior Publication Data

US 2020/0191440 A1 Jun. 18, 2020

Related U.S. Application Data

(62) Division of application No. 15/842,405, filed on Dec. 14, 2017, now Pat. No. 10,655,891.

(51) Int. Cl.
*F24H 9/20* (2022.01)
*F16K 37/00* (2006.01)

(52) U.S. Cl.
CPC ....... *F24H 9/2035* (2013.01); *F16K 37/0041* (2013.01)

(58) Field of Classification Search
CPC .................................................. F24H 9/2035
See application file for complete search history.

(56) References Cited

U.S. PATENT DOCUMENTS

| 2,673,603 | A | | 3/1954 | Outterson et al. |
| 2,682,922 | A | | 7/1954 | Nelson et al. |
| 3,112,876 | A | | 12/1963 | Sullivan et al. |
| 4,143,811 | A | * | 3/1979 | Sattmann ................ F23N 1/065 236/1 G |
| 4,190,414 | A | | 2/1980 | Elmy |
| 4,289,476 | A | | 9/1981 | Visos et al. |
| 4,789,329 | A | | 12/1988 | Bohan, Jr. et al. |
| 5,133,656 | A | | 7/1992 | Peterson |
| 5,673,680 | A | | 10/1997 | Kalmer et al. |
| 6,050,281 | A | | 4/2000 | Adams et al. |
| 6,908,300 | B1 | | 6/2005 | Donnelly |
| 7,497,386 | B2 | | 3/2009 | Donnelly et al. |
| 8,851,884 | B2 | | 10/2014 | Querejeta Andueza et al. |
| 8,882,492 | B2 | | 11/2014 | Querejeta Andueza et al. |
| 9,568,196 | B2 | | 2/2017 | Furmanek et al. |

(Continued)

FOREIGN PATENT DOCUMENTS

EP 0837283 B1 12/1999

*Primary Examiner* — Nathaniel Herzfeld
(74) *Attorney, Agent, or Firm* — Armstrong Teasdale LLP

(57) ABSTRACT

A system and method of operating a gas fuel valve control circuit are disclosed. The gas valve control circuit includes a gas valve assembly configured to control a flow of a fuel gas to a load and a switch assembly including a switch in each leg of a plurality of legs of a power supply to the gas valve assembly. The switch assembly is configured to supply power and a return to the gas valve assembly in a first position and to open the plurality of legs of the power supply to the gas valve assembly in a second position. The switch assembly is configured to indicate a position of the switch assembly.

20 Claims, 2 Drawing Sheets

(56) References Cited

U.S. PATENT DOCUMENTS

| | | |
|---|---|---|
| 2004/0137391 A1 | 7/2004 | Adams et al. |
| 2008/0092826 A1 | 4/2008 | Kishimoto et al. |
| 2009/0000302 A1 | 1/2009 | Edwards et al. |
| 2010/0086885 A1 | 4/2010 | Querejeta Andueza et al. |

* cited by examiner

200 ⬊

```
┌─────────────────────────────────────────────────────────┐
│ SENSING, BY A CONTROLLER, A POSITION SIGNAL OF A GAS    │
│ FUEL VALVE SWITCH THAT INCLUDES A FIRST COMPONENT       │
│ HAVING A FIRST ELECTRICAL CHARACTERISTIC AND A SECOND   │──202
│ COMPONENT HAVING A SECOND ELECTRICAL CHARACTERISTIC     │
│ WHEN THE GAS FUEL VALVE SWITCH IS IN AN OPEN POSITION,  │
│ THE SECOND ELECTRICAL CHARACTERISTIC BEING DIFFERENT    │
│ THAN THE FIRST ELECTRICAL CHARACTERISTIC, THE GAS FUEL  │
│ VALVE SWITCH MAINTAINING A POWER SUPPLY LEG AND A       │
│ POWER RETURN LEG OPEN WHEN THE GAS FUEL VALVE SWITCH    │
│ IS IN THE OPEN POSITION                                 │
└─────────────────────────────────────────────────────────┘
                              │
┌─────────────────────────────────────────────────────────┐
│ SENSING, BY THE CONTROLLER, THE POSITION SIGNAL OF THE  │
│ GAS FUEL VALVE SWITCH THAT INCLUDES ONLY THE FIRST      │
│ COMPONENT WHEN THE GAS FUEL VALVE SWITCH IS IN A        │──204
│ CLOSED POSITION, THE GAS FUEL VALVE SWITCH MAINTAINING  │
│ THE POWER SUPPLY LEG AND THE POWER RETURN LEG CLOSED    │
│ WHEN THE GAS FUEL VALVE SWITCH IS IN THE CLOSED         │
│ POSITION                                                │
└─────────────────────────────────────────────────────────┘
                              │
┌─────────────────────────────────────────────────────────┐
│ OPERATING THE GAS FUEL VALVE CONTROL SYSTEM USING THE   │──206
│ SENSED POSITION OF THE GAS FUEL VALVE SWITCH            │
└─────────────────────────────────────────────────────────┘
```

FIG. 2

GAS VALVE CONTROL SYSTEM FOR A WATER HEATER

CROSS REFERENCE TO RELATED APPLICATIONS

This application is a divisional application of U.S. application Ser. No. 15/842,405, filed Dec. 14, 2017, which is incorporated by reference in its entirety.

FIELD

This disclosure relates generally to water heater gas valve control circuits, and, more particularly, to a gas valve control circuit having a switch that provides a gas valve switch indication to a controller.

BACKGROUND

Water heaters typically include a manual gas shut off valve or an electrical switch that disconnects the gas valve from electrical power. Powered vent water heaters have typically used a master on/off switch to switch all power to the appliance off. If the valve has a system level switch that effectively stops operation of the water heater when off and disconnects power from the gas valve coil, the original equipment manufacturer (OEM) can eliminate the master switch from their assembly. Powered vent water heaters have a large inductive fan load, for example about 2 amps at 120 volts, due to the powered draft inducer. If a gas valve switch only switches the gas valve off and the control system remains energized, the control system may indicate errors to an operator when the control system attempts to light-off the water heater. This would be confusing to the operator who, by the position of the gas valve switch, thinks the water heater is shutdown. An improved control system is needed.

This background section is intended to introduce the reader to various aspects of art that may be related to the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a gas valve control circuit includes a gas valve assembly for controlling a flow of a fuel gas to a load and a switch assembly. The switch assembly supplies power and a return to the gas valve assembly in a first position and opens the plurality of legs of the power supply to the gas valve assembly in a second position. The switch assembly indicates a position of the switch assembly.

In another aspect, a method of operating a gas fuel valve control system includes sensing, by a controller, a position signal of a gas fuel valve switch that includes a first component having a first electrical characteristic and a second component having a second electrical characteristic when the gas fuel valve switch is in an open position wherein the second electrical characteristic being different than the first electrical characteristic, the gas fuel valve switch maintaining a power supply leg and a power return leg open when the gas fuel valve switch is in the open position. The method also includes sensing, by the controller, the position signal of the gas fuel valve switch that includes only the first component when the gas fuel valve switch is in a closed position. The gas fuel valve switch maintains the power supply leg and the power return leg closed when the gas fuel valve switch is in the closed position. The method further includes operating the gas fuel valve control system using the sensed position of the gas fuel valve switch.

In yet another aspect, a powered vent electronic control circuit includes a controller configured to control an operation of heating device having a powered draft inducer, a gas valve assembly configured to control a flow of a fuel gas to a burner of a heating device, and a switch assembly that includes a switch in each leg of a plurality of legs of a power supply to the gas valve assembly. The switch assembly is configured to supply power and a return to the gas valve assembly in a first position and to open the plurality of legs of the power supply to the gas valve assembly in a second position, the switch assembly is configured to indicate a position of the switch assembly to the controller.

BRIEF DESCRIPTION OF THE DRAWINGS

FIG. 2 is a flowchart of an example method of operating a gas fuel valve control system in accordance with an example embodiment of the present disclosure.

Figure 1:
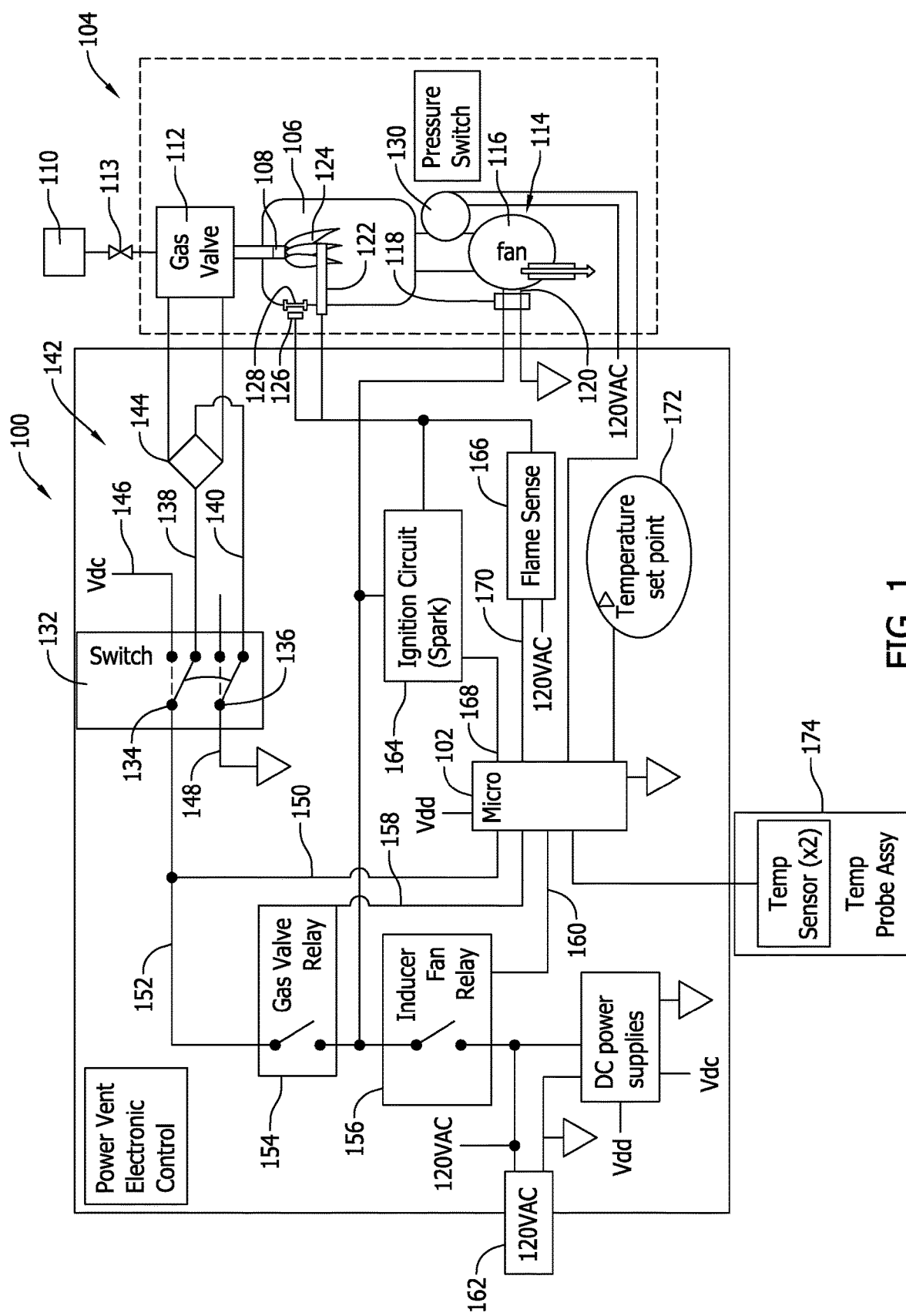
FIG. 1 is a schematic block diagram of a powered vent electronic control circuit in accordance with an example embodiment of the present disclosure.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to fuel gas valve control systems in industrial, commercial, and residential applications.

At least some known control systems use a relatively low power water heater valve for powered vent controls. Mains power is stepped down via a transformer to a lower voltage for loads, such as, but not limited to spark ignition, relay coils, logic, and gas valve coils. This allows the use of a low cost switch because the loads being switched are small and low voltage. However, this solution also requires a large expensive transformer to step down voltage to these loads, at least partially negating the savings realized by the low cost switch. Generating spark and flame sense voltage from the lower voltage is more expensive then powering them directly from mains voltage.

Embodiments of an improved fuel gas valve control system are described herein. In one embodiment, the fuel gas valve control system uses a double-pole double-throw (DPDT) manually-operated switch in the lowest cost location, such that its only load is the gas valve coil. It uses one of the "off" contacts to supply a low current DC voltage to the gas valve sense circuit. This allows the controller to sense the position of the switch using existing circuits for gas valve sense (Gas Valve Normally Open relay contact check). If the switch is turned off when there is no call for heat, the controller senses a DC voltage at a gas valve normally open (GVNO) terminal and prevents a call for heat and all indications of operation (LEDs etc.). If the gas valve switch is turned off during a call for heat, the gas valve will turn off, the control will sense a flame loss, turn off the GV relay, and try to re-light the burner. When the GV relay turns off, the control will see DC voltage and prevent a call for heat and all indications of operation (LEDs etc.).

The following description refers to the accompanying drawings, in which, in the absence of a contrary representation, the same numbers in different drawings represent similar elements.

FIG. 1 is a schematic block diagram of a powered vent electronic control circuit 100 in accordance with an example embodiment of the present disclosure. In the example embodiment, a controller 102 is configured to control an operation of heating device 104 such as, but not limited to a hot water heater. Heating device 104 includes, for example, a combustion chamber 106 for combusting a fuel, for example, a fuel gas, such as, but not limited to natural gas. The fuel gas is introduced into combustion chamber 106 through a burner 108 from a source of fuel gas 110. A flow of the fuel gas is controlled by a gas valve assembly 112. A fuel gas manual shutoff valve 113 is provided to isolate fuel from heating device 104.

Heating device 104 also includes a powered draft inducer 114, which includes a fan 116 and a prime mover, such as, but not limited to an electric motor 118 coupled together via a shaft 120. Fan 116 is coupled in flow communication with combustion chamber 106 to permit purging of combustion chamber 106 and exhausting of combustion gases generated during operation of heating device 104.

Heating device 104 further includes a plurality of sensors, which provide information to controller 102, typically in the form of electrical signals or electromagnetic signals received from the sensors. For example, a flame sensor 122 may be positioned within combustion chamber 106 to detect a flame 124 emanating from burner 108. In another example embodiment, a flame sensor 126 may be positioned outside of combustion chamber 106 with access to combustion chamber 106 through a viewing port 128. A pressure switch 130 is coupled in flow communication with combustion chamber 106 and configured to sense a pressure within combustion chamber 106.

Powered vent electronic control circuit 100 includes a switch assembly 132 that includes a first double-throw switch 134 and a second double-throw switch 136 in respective legs 138, 140 of a power supply circuit 142 to gas valve assembly 112. In the example embodiment, power supply circuit 142 includes a full wave bridge rectifier 144. In other embodiments, power supply circuit 142 may include other components to facilitate supplying electrical power from switch assembly 132 to gas valve assembly 112.

Switch assembly 132 is configured to supply power and a return to gas valve assembly 112 in a first position (shown in solid lines in FIG. 1) and to open the plurality of legs of power supply circuit 142 to gas valve assembly 112 in a second position (shown in dotted lines in FIG. 1). Switch assembly 132 includes first double-throw switch 134 configured to supply power to gas valve assembly 112 in the first position and to inject a switch assembly position signal 146 to controller 102 in a second position. Switch assembly 132 also includes second double-throw switch 136 configured to connect a return path 148 to gas valve assembly 112 in the first position and to open the return path from the gas valve in the second position.

A first important feature of switch assembly 132 is that it supplies electrical power only to only gas valve assembly 112, which permits use of a lighter duty and less expensive switch because of the lighter electrical load of only gas valve assembly 112. Another important feature of switch assembly 132 is that it provides an indication of its position to controller 102. Because switch assembly 132 is typically embodied in a manually-operated, two-position switch, without switch assembly 132 indicating its position to controller 102, switch assembly 132 could be opened, removing power from gas valve assembly 112. Controller 102 would then detect errant operation of heating device 104 without a known or discernible cause. This could put powered vent electronic control circuit 100 in an in determinant state, from which it would not be able to generate proper outputs.

In the example embodiment, controller 102 is configured to sense a gas valve position signal 150 having only an alternating current (AC) component when the switch assembly is in the first position. The AC component is supplied by an input power supply line 152 to switch assembly 132. Controller 102 is also configured to sense a gas valve position signal having an AC component and a direct current (DC) component when the switch assembly is in the first position.

Powered vent electronic control circuit 100 also includes a gas valve relay 154 and an inducer fan relay 156. Each of gas valve relay 154 and inducer fan relay 156 are controlled by controller 102 through respective control lines 158, 160. Contacts of gas valve relay 154 and inducer fan relay 156 are coupled serially between a mains power supply 162 for powered vent electronic control circuit 100 and switch assembly 132.

Powered vent electronic control circuit 100 also includes a spark ignition circuit 164 and a flame sensing circuit 166, which are both controlled by controller 102 through respective control lines 168, 170.

Powered vent electronic control circuit 100 also includes a parameter set point input device 172 and a parameter sensor 174 configured to provide inputs to controller 102. In the example embodiment, a temperature set point is selectable through parameter set point input device 172 and parameter sensor 174 is embodied as a temperature sensor. In the example embodiment, when parameter sensor 174 senses a temperature less than a set point temperature, controller 102 generates the appropriate signals to operate heating device 104.

FIG. 2 is a flowchart of an example method 200 of operating a gas fuel valve control system in accordance with an example embodiment of the present disclosure. In the example embodiment, method 200 includes sensing 202, by a controller, a position signal of a gas fuel valve switch that includes a first component having a first electrical characteristic and a second component having a second electrical characteristic when the gas fuel valve switch is in an open position. Typically, the second electrical characteristic is different than the first electrical characteristic. For example, in an embodiment, the first electrical characteristic may be a frequency of the first component. A signal having a frequency greater than zero Hertz is considered to be an alternating current (AC) signal. A signal having a frequency approximately equal to zero is considered to be a direct current (DC) signal. An AC signal may oscillate about a "zero" amplitude level. A DC signal may be combined with the AC signal to generate an AC signal with a "zero" offset approximately equal to the amplitude of the DC signal. In the example embodiment, a switch position signal indicates a position of switch assembly 132 using only an AC signal component to indicate a first position or using an AC signal component and a DC signal component to indicate a second position of switch assembly 132. In other embodiments, the signal components may be represented by other electrical characteristics that allow the position of switch assembly 132 to be ascertained by controller 102. Method 200 also includes sensing, by the controller, the position signal of the gas fuel valve switch that includes only the first component when the gas fuel valve switch is in a closed position, the gas fuel valve switch maintaining the power supply leg and the power return leg closed when the gas fuel valve switch is in the closed position. Method 200 further includes operating 206 the gas fuel valve control system using the sensed position of the gas fuel valve switch.

The foregoing detailed description illustrates embodiments of the disclosure by way of example and not by way of limitation. It is contemplated that the disclosure has general application to heating devices not incorporated into a water heater. It is further contemplated that the methods and systems described herein may be incorporated into existing heating devices, in addition to being maintained as a separate stand-alone method and system.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

This disclosure has been described in terms of example embodiments of a novel gas valve control system for heating devices. Various changes, modifications, and alterations in the teachings of the present disclosure may be contemplated by those skilled in the art without departing from the intended spirit and scope thereof. It is intended that the present disclosure encompass such changes and modifications.

The above-described embodiments of a method and system of operating a gas fuel valve control system using the sensed position of the gas fuel valve switch provides a cost-effective and reliable means for deenergizing a gas fuel valve using both legs of a power supply to the gas fuel valve. The methods and systems described herein permit use of a lighter duty gas fuel valve switch than at least some known powered vent heating systems are capable of using due to the gas fuel valve being the only load switched in the present disclosure, as opposed to other known systems using the gas fuel valve switch to also switch, for example, a large inductive fan load or an ignition circuit load. The methods and systems described herein facilitate indicating to a heating device controller the position of the gas fuel valve switch. In addition, the above-described methods and systems facilitate maintaining the heating device controller in an operational state while the gas fuel valve switch is turned off. As a result, the method and systems described facilitate a cost-effective and reliable gas fuel valve control system.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a water heater gas fuel valve control system, the method comprising:
    sensing, by a controller, a position signal of a gas fuel valve switch that includes a first component having a first electrical characteristic and a second component having a second electrical characteristic when the gas fuel valve switch is in an open position, the second electrical characteristic being different than the first electrical characteristic, the gas fuel valve switch maintaining a power supply leg and a power return leg open when the gas fuel valve switch is in the open position; and
    sensing, by the controller, the position signal of the gas fuel valve switch that includes only the first component when the gas fuel valve switch is in a closed position, the gas fuel valve switch maintaining the power supply leg and the power return leg closed when the gas fuel valve switch is in the closed position; and
    operating the gas fuel valve control system using the sensed position of the gas fuel valve switch.

2. The method of claim 1, wherein the first electrical characteristic is a frequency characteristic greater than approximately zero Hertz and the second electrical characteristic is a frequency characteristic equal to approximately zero Hertz.

3. The method of claim 1, wherein the first electrical characteristic and the second electrical characteristic are voltage characteristics.

4. The method of claim 1, further comprising manually positioning the gas fuel valve switch from one of the open position and closed position to another of the open position and closed position.

5. A method of operating a heating device using a water heater controller, the method comprising:
supplying electrical power to a gas valve relay and an inducer fan through an inducer fan relay;
supplying electrical power to only a gas fuel valve from the gas valve relay through a gas fuel valve switch;
sensing, by a processor, a position signal of the gas fuel valve switch, the position signal including a first electrical signal component having a first electrical characteristic and a second electrical signal component having a second electrical characteristic when the gas fuel valve switch is in an open position, the second electrical characteristic being different than the first electrical characteristic, the gas fuel valve switch maintaining a power supply leg and a power return leg open when the gas fuel valve switch is in the open position; and
sensing, by the processor, the position signal of the gas fuel valve switch that includes only the first component when the gas fuel valve switch is in a closed position, the gas fuel valve switch maintaining the power supply leg and the power return leg closed when the gas fuel valve switch is in the closed position; and
operating the water heater controller using the sensed position of the gas fuel valve switch.

6. The method of claim 5, wherein sensing, by a processor, a position signal of the gas fuel valve switch, the position signal including a first electrical signal component having a first electrical characteristic and a second electrical signal component having a second electrical characteristic when the gas fuel valve switch is in an open position comprises sensing, by the processor, the position signal of the gas fuel valve switch, the position signal including the first electrical signal component having a first frequency and the second electrical signal component having a second frequency when the gas fuel valve switch is in the open position.

7. The method of claim 5, wherein sensing, by a processor, a position signal of the gas fuel valve switch, the position signal including a first electrical signal component having a first electrical characteristic and a second electrical signal component having a second electrical characteristic when the gas fuel valve switch is in an open position comprises sensing, by the processor, the position signal of the gas fuel valve switch, the position signal including the first electrical signal component having a mains frequency value and the second electrical signal component having a zero frequency value when the gas fuel valve switch is in the open position.

8. The method of claim 5, wherein sensing, by a processor, the position signal of the gas fuel valve switch that includes only the first component when the gas fuel valve switch is in a closed position comprises sensing, by the processor, the position signal of the gas fuel valve switch that includes only a mains frequency component when the gas fuel valve switch is in a closed position.

9. The method of claim 5, further comprising actuating at least one of the inducer fan relay and the gas valve relay directly by the processor.

10. The method of claim 5, further comprising preventing the gas fuel valve from opening when the inducer fan is not operating.

11. The method of claim 5, further comprising receiving informational signals from a plurality of sensors communicatively coupled to the heating device and determining a state of the heating device using the received informational signals and the sensed gas fuel valve switch position.

12. The method of claim 11, further comprising generating, by the controller, signals to operate the heating device based on the determined state of the heating device.

13. A water heater controller comprising:
a gas valve assembly configured to control a flow of a fuel gas to a water heater;
a gas valve relay configured to supply power to the gas valve assembly;
an inducer fan relay configured to supply electrical power to a combustion chamber draft inducer fan and the gas valve relay;
a gas fuel valve switch assembly electrically coupled between the gas valve relay and the gas valve assembly to control power to the gas valve assembly; and
a processor configured to:
receive an electrical signal from only the gas valve relay indicating the gas fuel valve switch assembly is in a first position; and
receive an electrical signal from the gas valve relay and a gas fuel valve switch indicating the gas fuel valve switch assembly is in a second position; and
operate the water heater controller based on whether the gas fuel valve switch assembly is in the first position or in the second position.

14. The water heater controller of claim 13, wherein the switch assembly comprises a switch in each leg of a plurality of legs of a power supply to the gas valve assembly, the switch assembly configured to supply power and a return to the gas valve assembly in the first position and to open the plurality of legs of the power supply to the gas valve assembly in the second position.

15. The water heater controller of claim 13, wherein the switch assembly comprises a first double-throw switch configured to supply power to the gas valve assembly in the first position and to inject a switch assembly position signal to the controller in the second position.

16. The water heater controller of claim 13, wherein the switch assembly comprises a second double-throw switch configured to connect a return path to the gas valve assembly in a first position and to open the return path from the gas valve assembly in a second position.

17. The water heater controller of claim 13, wherein the switch assembly comprises a manually operated switch.

18. The water heater controller of claim 13, wherein the switch assembly is electrically coupled to the gas valve assembly through a bridge rectifier circuit.

19. The water heater controller of claim 13, wherein the controller is configured to sense a gas valve position signal having only an alternating current (AC) component when the switch assembly is in the first position.

20. The water heater controller of claim 13, wherein the controller is configured to sense a gas valve position signal having an AC component and a direct current (DC) component when the switch assembly is in the second position.

* * * * *